United States Patent [19]
Chuang et al.

[11] Patent Number: 6,015,967
[45] Date of Patent: Jan. 18, 2000

[54] GROUND DRIFT-FREE SWITCHING CIRCUIT

[75] Inventors: Cheng-Woei Chuang, Hsin-Chu; Kuen Lin Guan, Pu-Zi, both of Taiwan

[73] Assignee: Taiwan Semiconductor Manufacturing Company, Ltd., Hsin-chu, Taiwan

[21] Appl. No.: 09/072,934

[22] Filed: May 5, 1998

[51] Int. Cl.[7] .................................................. H05B 1/02
[52] U.S. Cl. .......................................... 219/519; 219/497
[58] Field of Search .................................. 219/201, 209, 219/250, 510–513, 519, 508; 374/1

[56] References Cited

U.S. PATENT DOCUMENTS

| | | | |
|---|---|---|---|
| 3,789,190 | 1/1974 | Orosy et al. | 219/497 |
| 4,196,848 | 4/1980 | Falkenstein | 232/46 R |
| 5,287,061 | 2/1994 | Dechene et al. | 324/454 |
| 5,498,261 | 3/1996 | Strul | 606/29 |
| 5,719,378 | 2/1998 | Jackson, Jr. et al. | 219/497 |

*Primary Examiner*—Philip H. Leung
*Assistant Examiner*—Jeffrey Pwu
*Attorney, Agent, or Firm*—Tung & Associates

[57] ABSTRACT

A switching circuit for selectively switching either of two input signals to an output circuit employs electrically isolated separate input circuits with independent grounds to prevent drift of the output signal delivered by the output circuit. Circuit isolation and independent grounds are made possible by the use of a single relay employing separate poles acting with two pairs of contacts respectively coupled with the input circuits. The switching circuit may be employed in a temperature control system for alternately coupling temperature and calibration signals to a temperature controller.

2 Claims, 3 Drawing Sheets

GROUND DRIFT-FREE SWITCHING CIRCUIT

FIELD OF THE INVENTION

The present invention generally relates to circuits for reducing signal drift and achieving circuit isolation, and deals more particularly with the elimination of ground signal drift in a temperature control system.

BACKGROUND OF THE INVENTION

Certain characteristics of signals in electronic circuits may drift from time to time as a result of undesirable circuit characteristics, or interference from other signals. Once identified, compensation may be added to a circuit to cancel out drift, or the circuit may be redesigned to eliminate the reason or source for the drift.

The problem of signal and ground drift in certain control systems is particularly serious where signal strengths are quite low, and the sources of signal drift are rather strong in comparison. For example, in temperature control systems, a sensed temperature signal of relatively low signal strength is fed back to a temperature control circuit that must be periodically calibrated to assure its accuracy. As a means of calibrating circuit, a calibration signal is applied to the control circuit which also receives the temperature signal. Since the control circuit employs a common input employed with a common ground, a certain amount of residual bias or offset current is present in this input circuit which results from the last signal that was input to the temperature control circuit. This residual bias or offset is either subtracted from or added to the applied temperature or calibration signal, thus creating a certain amount of signal error. The input signal is later compared to threshold values and, because of the signal error, the threshold comparison my yield an incorrect result, e.g., the signaling of an alarm when in fact the input signal does not truly indicate an alarm.

Thus, there is a clear need in the art for an improved circuit arrangement, particularly for temperature control systems, which eliminates bias, offset or drift of input signals.

SUMMARY OF THE INVENTION

According to one aspect of the invention, a drift-free switchable circuit for selectively outputting either of first and second signals is provided, which includes first and second input circuits, an output circuit and switching means for selectively coupling the output circuit with either of the input circuits. Signal drift is essentially eliminated as a result of providing the input circuits with separate, independent grounds, so that these circuits are isolated from each other and residual signal components from a previously switched signal are not combined with a subsequently switched signal. The switching means preferably comprises a single, simple relay including a coil operating a pair of double throw switch poles which are respectively switchable between two pairs of contacts that are in turn respectively coupled to the independent input circuits.

According to another aspect of the invention, a temperature control system is provided which includes means for sensing the temperature within an environment to be controlled and producing a sensed temperature signal, a temperature control circuit for controlling the temperature in the environment, calibration means for producing a calibration signal, and switching means for selectively coupling either of the sensing means or calibration means with the temperature control circuit. The switching means includes first and second circuits respectively coupled with the sensing means and calibration means, as well as switchable means for completing a circuit selectively either between the sensing means and the temperature control circuit, or between the calibration means and the temperature control circuit. The first and second circuits are independent of each other and include respective separate grounds in order to assure that the output signal delivered to the temperature control circuit is drift-free and does not include residual bias or offset signal components.

Accordingly, it is a primary object of the present invention to provide a drift-free switchable circuit for selectively outputting either of first and second signals which eliminates residual signal components which would otherwise create signal error in the form of a bias or offset.

A further object of the present invention is to provide a switchable circuit as described above which employs a single relay and a pair of independent circuits provided with separate, isolated grounds to achieve signal isolation.

A further object of the present invention is to provide a temperature control circuit employing the switchable circuit above in order to improve temperature control accuracy, eliminate signal errors and reduce false alarms.

These, and further objects of the invention will be made clear or will become apparent during the course of the following description of a preferred embodiment of the invention.

BRIEF DESCRIPTION OF THE DRAWINGS

In the drawings, wherein like components are designated by identical numerals and the various views.

DETAILED DESCRIPTION OF THE PREFERRED EMBODIMENT

Figure 1:
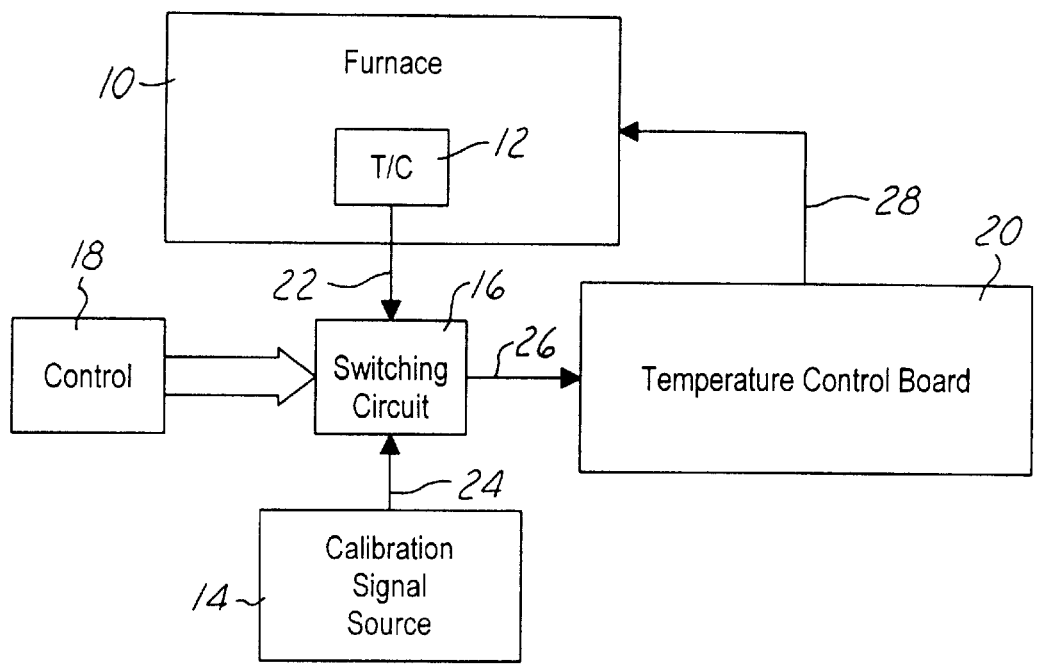
FIG. 1 is an overall block diagram of a temperature control system according to the prior art.

Referring first to FIG. 1, a temperature control system for a temperature controlled environment such as the furnace 10, broadly comprises a thermocouple type sensor 12 disposed within the furnace 10 which outputs a sensed temperature signal on line 22 which is delivered through a switching circuit 16 on line 26 to a temperature control circuit or board 20 which operates to deliver control signals on line 28 to the furnace 10. The switching circuit 16 also receives a calibration signal on line 24 from a calibration signal source 14. A control 18 such as a simple switch or push-button (not shown) controls the switching circuit 16 such that either the calibration signal on line 24 or the temperature signal on line 22 is switched through on output line 26 to the temperature control board 20. The calibration signal is periodically delivered to the temperature control board 20 in order to properly calibrate the temperature control circuitry which is employed to maintain the temperature within the furnace 10 at a desired reference level $T_r$. The calibration signal typically is a relatively low level signal, e.g., 8 millivolts.

Figure 2:
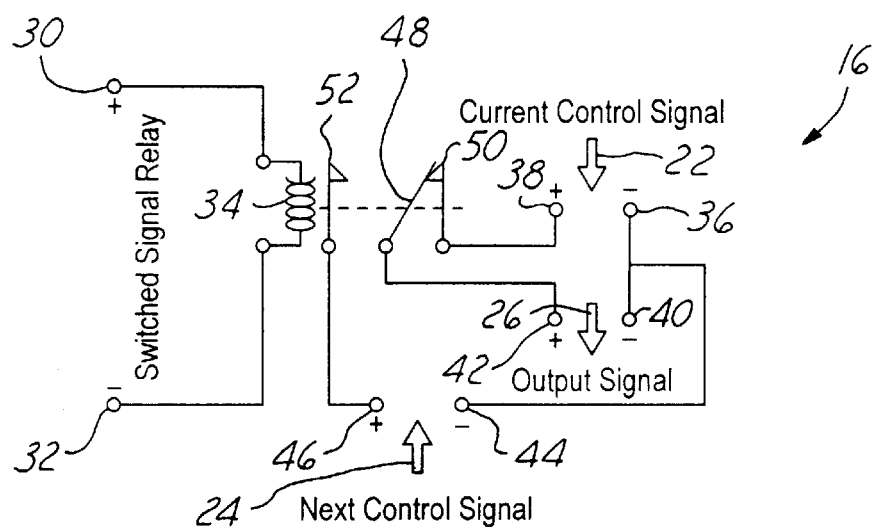
FIG. 2 is a schematic diagram of the switching circuit employed in the prior art temperature control system of FIG. 1.

Referring now also to FIG. 2 which depicts the details of the prior art switching circuit 16, the control signal from control 18 is delivered to the input terminals 30, 32 of a relay comprising a relay coil 34 acting on a single pole double throw switch which includes a pole 48 and a pair of contacts 50, 52. Contact 50 forms part of a first series circuit comprising a pair of contacts 36, 38 which are negative and positive, respectively, a second pair of contacts 40, 42 which likewise are negative and positive, respectively, and finally the pole 48 which makes connection with the contact 50. Contacts 36, 38 are connected in series with the thermocouple 12 (FIG. 1) and thus receives the control signal 22. When the pole 48 connects with contact 50, the temperature indicating signal from the thermocouple 12 passes through the above described first circuit and is output across contacts 40, 42 as the output signal in line 26 to the temperature control board 20 (FIG. 1). A second, series circuit comprises contact 52 that is coupled through the pole 48 to contacts 44, 46 which are negative and positive, respectively, and the above described output contacts 40, 42. Thus, when the relay 34 switches pole 48 into connection with contact 52, the calibration signal 24 which is coupled with contacts 44, 46 is output through contacts 40, 42 onto line 26. As designated herein, the negative terminals 36, 40 and 44 are at ground potential.

A serious problem results from the fact that the two circuits alternately switched through the relay circuit, share a common ground, i.e., terminals 36, 40 and 44 are connected to the same ground potential. Because the signals that are being switched are of relatively low signal strength, their levels are materially influenced by the presence of ground leakage that is present in these two circuits due to the fact that the two circuits share a common ground. Thus, a certain level of residual current in the first circuit resulting from the temperature signal on line 22 remains at the ground (negative) terminal, and is thus injected into the second circuit when the relay switches the calibration signal 24 through on line 26 to the temperature control board 20. This residual or ground leakage occurrence, depending on its magnitude and polarity, either adds to or substrates from the signal that is switched through to the temperature control board 20.

Figure 3:
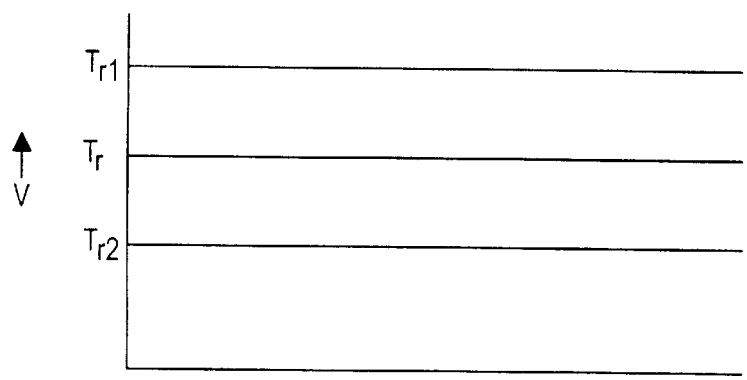
FIG. 3 is a signal level diagram showing the output temperature signal delivered to the temperature control circuit.

Referring to FIG. 3, the temperature control board 20 (FIG. 1) is designed to receive a reference temperature signal, $T_r$, and this signal level corresponds to the magnitude of the calibration signal produced by the calibration signal source 14. The circuitry of the temperature control board 20 includes conventional comparison means (not shown) which compares the reference temperature $T_r$ with upper and lower reference levels, $T_{r1}$, and $T_{r2}$, respectively. When the temperature signal sensed by the circuitry within the board 20 is either above or below the threshold references, $T_{r1}$ $T_{r2}$, then either an alarm is issued or corrective action is taken in the form of control signals on line 28 which operate to change the temperature in the furnace 10.

Figure 4:
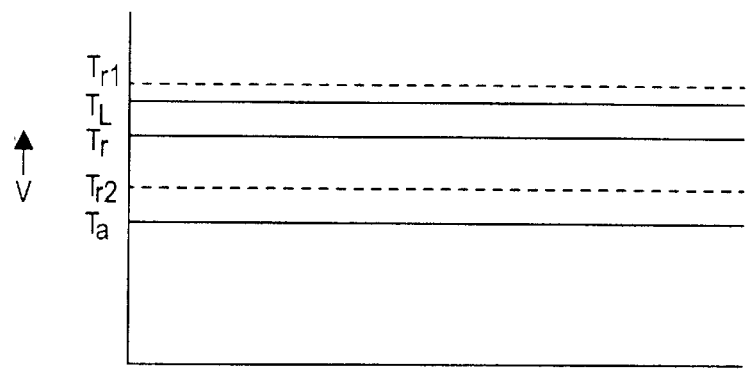
FIGS. 4 and 5 are views similar to FIG. 3 but showing the effects of signal offset resulting from drift occurring in the prior art system of FIG. 1.
Figure 5:
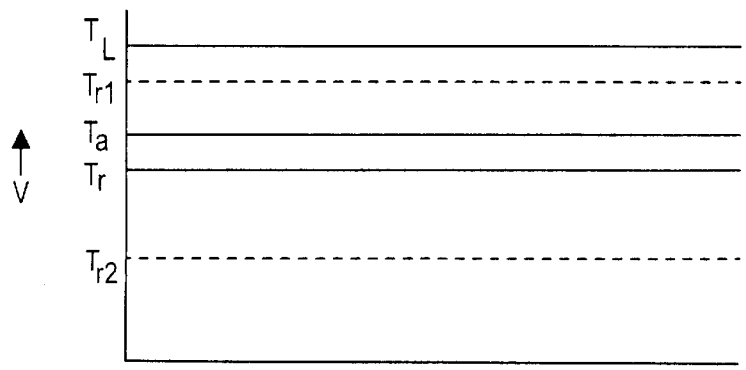

Referring now also to FIGS. 4 and 5, the effect of the above mentioned leakage or residual current resulting from the fact that the two switched circuits share a common ground, functions to either increase the two threshold references, $T_{r1}$, $T_{r2}$ (see FIG. 4) or decrease these two reference values, as shown in FIG. 5. In FIG. 4, the diminished values resulting from a leakage current which reduces the temperature references, $T_{r1}$, $T_{r2}$, are respectively designated as $T_L$ and $T_a$. Likewise, in FIG. 5, it can be seen that the increased threshold values $T_L$ and $T_a$ increase the normal reference thresholds above $T_{r1}$, and $T_{r2}$. The result of the signal offsets discussed above is that when, for example, as shown in FIG. 4, a sensed temperature signal produced by the thermocouple 12, lies between $T_{r2}$ and $T_a$, the alarm or other corrective action fails to be initiated. On the other hand, when the leakage or residual ground current increases the threshold references, as shown in FIG. 5, if the sensed temperature signal produced by the thermocouple 12 lies between $T_L$ and $T_{r1}$ a false alarm or corrective action is initiated in error.

Figure 6:
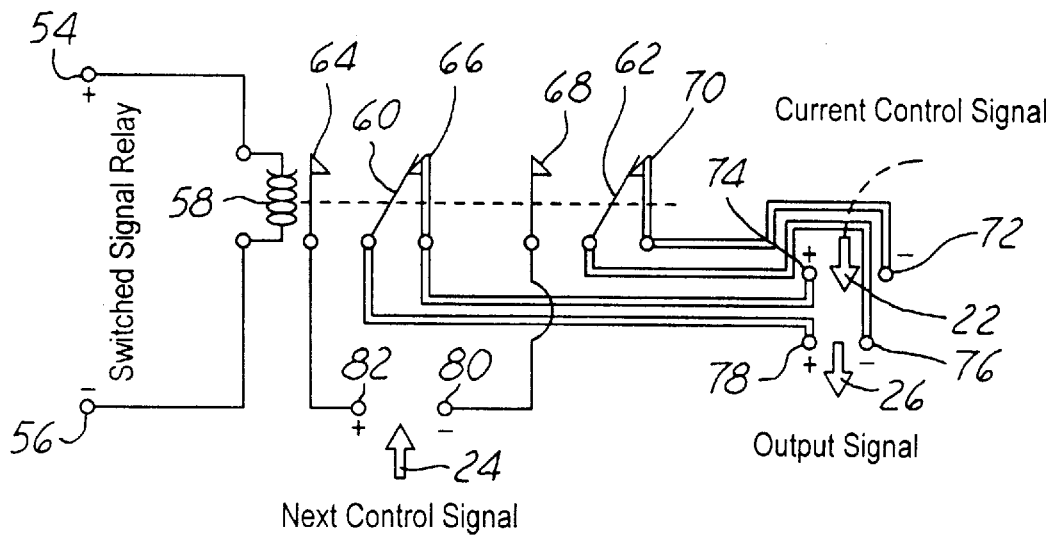
FIG. 6 is a detailed schematic diagram of a switching circuit according to the preferred embodiment of the present invention.
Figure 7:
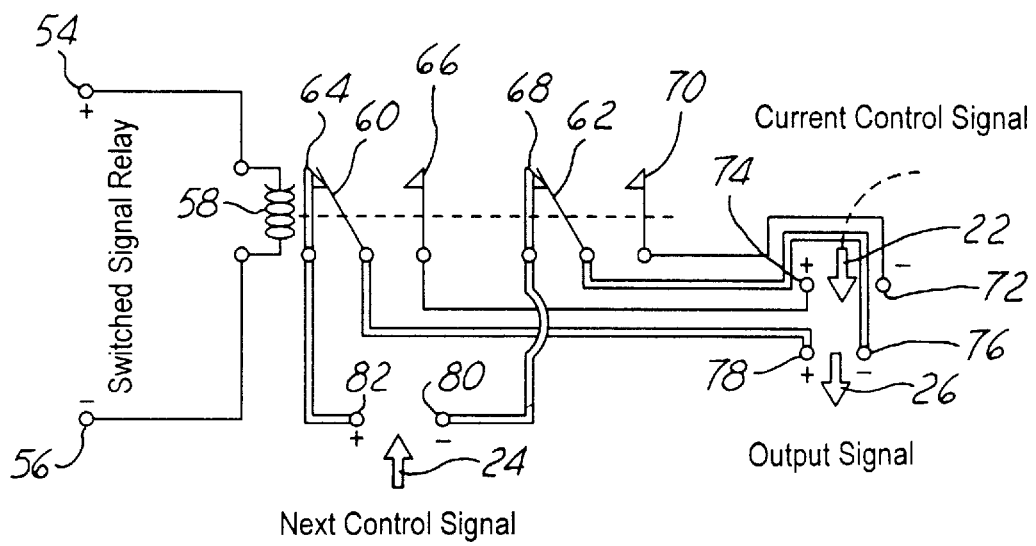
FIG. 7 is a view similar to FIG. 6 but depicting the relay in a second position thereof.

In order to eliminate the undesirable temperature reference drift discussed above resulting from the use of a common ground, an inventive circuit arrangement has been devised, as shown in FIGS. 6 and 7, which achieves isolation of the two switched circuits by using separate, independent grounds. This signal isolation is achieved by devising a pair of independent switched circuits which are coupled through two sets of independent contacts forming part of a single relay, in contrast to the prior art arrangement (FIG. 2) wherein the two switched circuits are connected to a common ground by a single pair of relay contacts.

Referring now specifically to FIG. 6, the control signal derived from the control 18 (FIG. 1) is input across terminals 54, 56 to energize a coil 58 which forms part of a double pole double throw relay. The relay includes a pair of poles 60, 62, which are respectively switched by the coil 58 between two sets of contacts 64, 66 and 68, 70. With the relay shown switched to one position depicted in FIG. 6, a first independently switched circuit for switching the thermocouple signal through to the temperature control board 20 is completed which is defined by a first, negative portion, traceable through contacts 72, 76 relay poles 62 and contact 70, and a second, positive portion traceable through contacts 74, 78, relay pole 60 and contact 66. Thus, the thermocouple signal applied to the switching circuit 16 via line 22 (FIG. 1) is applied to the input contacts 72, 74 and is delivered to terminal 76, 78 which output the thermocouple signal on line 26. It may be observed that with the relay in its condition shown in FIG. 6, the second switched circuit, adapted for coupling the calibration signal from the source 14 to the temperature control board 20 is isolated from the first switch and circuit described above.

Referring now specifically to FIG. 7, when the relay is switched to its alternate position for purposes of sending the calibration signal to the temperature control board 20, the relay poles 60, 62 are connected with the relay contacts 64, 68, thus energizing the second switched circuit which comprises two portions. The first portion of the second switch circuit is formed by the negative terminal 80 which is connected via contact 68 and relay pole 62 to the negative output terminal 76. The second portion of this circuit is formed by the positive input terminal 82 which is coupled through contact 64 and relay pole 60 to the positive output terminal 78. Input terminals 80, 82 receive the calibration signal from the source 14, and this signal is delivered through the relay so as to be output via terminals 76, 78 onto line 26.

The system shown in FIGS. 6 and 7 thus provides complete ground isolation between the two switched circuits, and thus eliminates the problem of ground drift, leakage currents and residual signal components, so that the sensed temperature signal produced by the thermocouple 12 and the calibration signal by the source 14 are delivered to the temperature control board 20, unaffected by these undesirable influences which heretofore created signal errors. As a result, superior temperature control is achieved while still using the simplicity of a single relay.

From the foregoing, it is apparent that the invention not only provides for the reliable accomplishment of the objects of the invention but does so in a simple and effective manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. A temperature control system comprising:

means for sensing the temperature within an environment to be controlled and for producing a first signal related to the sensed temperature;

a temperature control circuit responsive to a signal of varying level for controlling the temperature in said environment, calibration means for producing a second signal for calibrating said temperature control circuit; and switching means for selectively coupling either of said sensing means and said calibration means with said temperature control circuit, whereby one of said first and second signals is delivered to said temperature control circuit, said switching means including:
   (1) a first circuit coupled with said sensing means and including a first ground,
   (2) a second circuit coupled with said calibration means and including a second ground, said first and second grounds being separate and isolated from each other, each of said first and second circuits having a residual level of electrical current therein, and
   (3) switchable means for completing a circuit either between said sensing means and said temperature control circuit, or between said calibration means and said temperature control circuit, said switchable means including a relay and fist and second pairs of electrical contacts, respectively connected to said first and second circuits, each contact in said first pair thereof being coupled with a different one of said first and second grounds such that upon switching of said switchable means to complete a circuit between said temperature control circuit and one of said sensing means and said calibration mans the residual current in one of said first and second circuits does not alter the level of said signal of varying level delivered to said temperature control circuit.

2. The temperature control circuit of claim 1, wherein said relay comprises a double pole, double throw relay.

* * * * *